(12) United States Patent
Spencer et al.

(10) Patent No.: US 8,392,149 B1
(45) Date of Patent: Mar. 5, 2013

(54) ADAPTIVE SECOND ORDER THRESHOLD CALIBRATION TECHNIQUE FOR RADIOMETRIC SIGNAL DETECTION

(75) Inventors: W. Sam Spencer, Cedar Rapids, IA (US); Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 272 days.

(21) Appl. No.: 12/877,397

(22) Filed: Sep. 8, 2010

(51) Int. Cl.
*G06F 15/00* (2006.01)
(52) U.S. Cl. .................................................. 702/193
(58) Field of Classification Search .................... 702/193
See application file for complete search history.

(56) References Cited

PUBLICATIONS

Over Agilent Spectrum Analysis Basics, Application Note 150, Agilent Technologies, Inc. 2004 Printed in U.S.A., Apr. 27, 2004, 120 pages.*

* cited by examiner

*Primary Examiner* — Tung S Lau
(74) *Attorney, Agent, or Firm* — Donna P. Suchy; Daniel M. Barbieri

(57) ABSTRACT

A apparatus configured to detect the presence of one or more unknown signals in the presence of noise and/or interference. The apparatus includes an input configured to receive an input data from a sensor, an integrator configured to integrate the power of the input data over a period of time, and a comparator configured to compare the integrated power to a threshold to determine if the input data contains at least one signal, or if the input data contains noise only. The apparatus may further include a mean estimator configured to estimate the mean of the power integrated input data over a period of time, a variance estimator configured to estimate the variance of the power integrated input data over a period of time, and a threshold calculator configured to calculate the threshold value based on the estimated mean or estimate mean and estimated variance.

12 Claims, 6 Drawing Sheets

ADAPTIVE SECOND ORDER THRESHOLD CALIBRATION TECHNIQUE FOR RADIOMETRIC SIGNAL DETECTION

RELATED APPLICATIONS

This application is filed concurrently with commonly assigned, non-provisional U.S. patent application Ser. No. 12/877,418, entitled "COGNITIVE NETWORKED ELECTRONIC WARFARE" listing as inventors Shubha L. Kadambe, Benjamin J. Haan, Jason A. Fuemmeler, William S. Spencer, Carlos J. Chavez, and Robert J. Frank, which is incorporated by reference herein.

BACKGROUND

Sensing the use of radio frequencies, identifying the users, and potentially jamming their future use are becoming increasingly important in many fields. Such Radio Frequency (RF) sensing and jamming techniques are being used in military applications, law enforcement, and commercial applications. Military applications include Electronic Warfare (EW), such as (a) Electronic Situation Awareness (ESA) (e.g., mapping all the RF signals present in a given region), (b) Electronic Attack (EA) (e.g., (i) deactivation of IEDs and (ii) jamming enemy communications), and (c) Electronic Protection (EP) (e.g., identifying friendly communication being jammed and protecting it from being jammed by changing the frequency). Just RF sensing alone can also be used for many military applications, such as eavesdropping on enemy communication, Signal Intelligence (SIGINT) and Communication. Intelligence (COMINT). Law enforcement applications may include disrupting communications of criminals in drug raids and terrorists, and dealing with hostage situations. Commercial applications may include prevention of corporate espionage.

Several systems have been developed for RF EW and some commercial products are available. These systems are based on energy detectors, maximum likelihood based classifiers, and a signal generator that jams the identified source. However, conventional systems are unable to automatically adapt to the environmental conditions, cannot handle signals that are unknown to the system, and are developed for the detection and classification of only certain broad classes of RF signals. Furthermore, conventional systems often have limited adaptation capability, which if available, is typically handled by manual adjustment. These systems are able to collect data when they encounter signals that the system is not trained for. However, such data is unusable until the systems are retrained in the laboratory and redeployed. Such a process takes months. By then new signals/threats may appear in the field of operations.

In particular, the accurate detecting of signals in a noisy environment has proven to be a difficult task. This task is made especially difficult as noise and/or interference, each of which may or may not be known, may vary with time.

SUMMARY

In view of the foregoing, the present disclosure presents an adaptive second order threshold calibration technique for radiometric signal detection. The disclosed system includes an apparatus configured to detect the presence of one or more unknown signals in the presence of noise and/or interference. The apparatus includes an input configured to receive input data from a sensor, an integrator configured to integrate the power of the input data of a period time, and a comparator configured to compare the integrated power to a threshold to determine if the input signal contains at least one signal or if the input data contains noise only. The apparatus may further include a mean estimator configured to estimate the mean of the integrated power of the input data over a period of time, a variance estimator configured to estimate the variance of the integrated power of the input data over a period of time, and a threshold calculator configured to calculate the threshold value based on the estimated mean or estimate mean and estimated variance.

The apparatus may further utilize a signal classifier configured to classify the input data into a classification in the case that the comparator determines that the input data contains at least one signal. The signal classifier is configured to classify the input data into the classification of at least a known signal class, an unknown signal class, or a noise class. The apparatus also includes a signal excisor configured to excise the integrated power of the input data from the mean estimator and the variance estimator in the case that the signal classifier classifies the input data as the known signal class or the unknown signal class.

DETAILED DESCRIPTION

Figure 1:
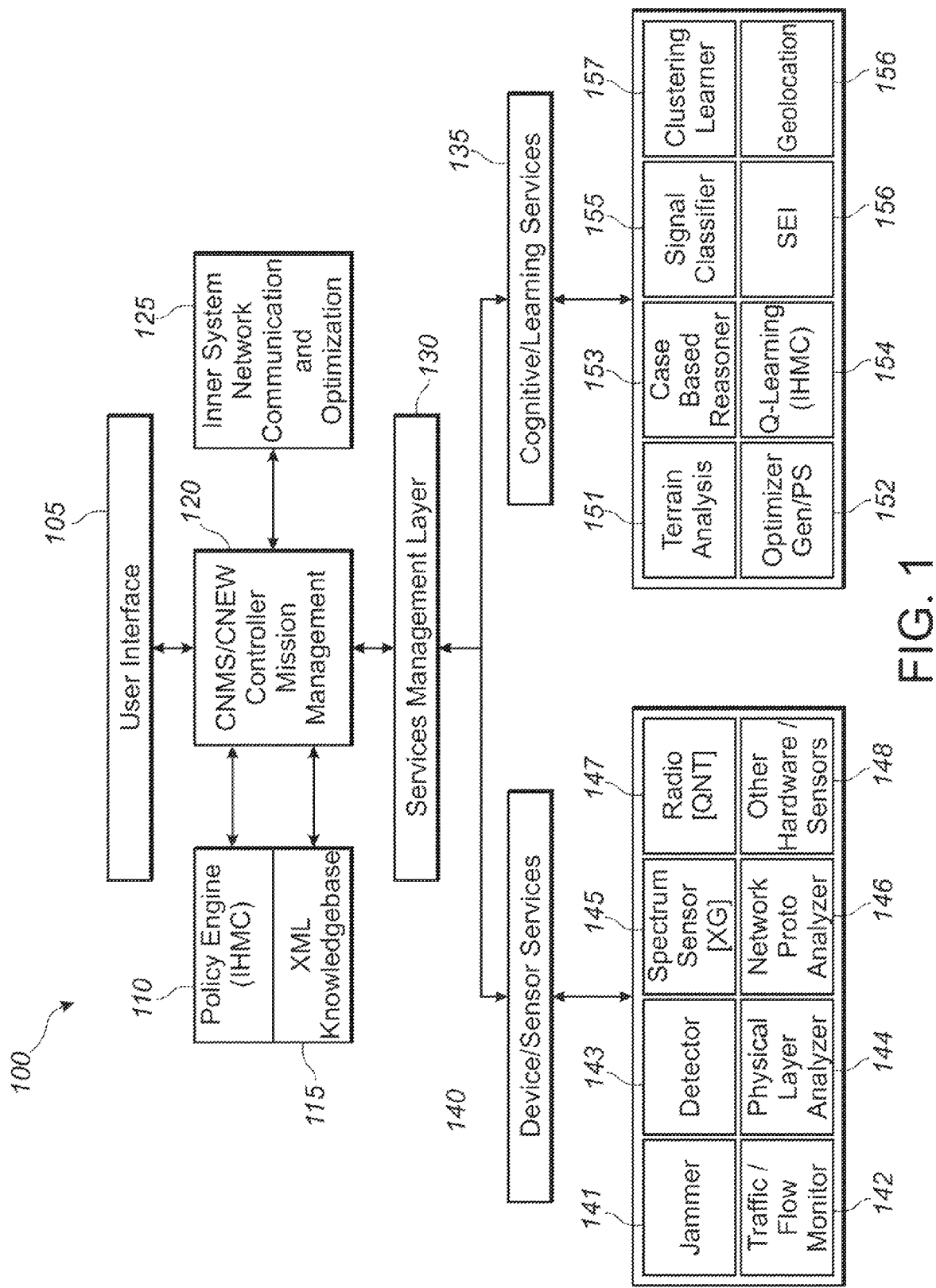
FIG. 1 shows a block diagram of the architecture of the disclosed system.

FIG. 1 shows a block diagram of the software-defined open architecture of the disclosed system. Preferably, each of the functional blocks shown in system 100 are implemented as software routines capable of running on a general purpose computer or radio/sensor hardware that has general purpose processors and is capable of controlling specific hardware (e.g., radio, jammer, RF sensor, spectrum analyzer, etc.) that will be described below. The disclosed CNEW system 100 is a service-oriented, event-driven system. In general, two types of services are provided—device/sensor-based services 140 and cognitive/learning-based services 135. These services are further divided into specific sub-services. For example, device/sensor-based services 140 may include a jammer 141, a detector 143, a spectrum sensor 145, a radio 147, a traffic/flow monitor 142, a physical layer analyzer 144, a network protocol analyzer 146, and other hardware/sensors 148. The cognitive/learning service 135 may include terrain analysis 151, a case-based reasoner 153, a signal classifier 155, a clustering learner 157, an optimizer 152, Q-learning module 154, specific emitter identification (SEI) module 156, and a geolocation module 158.

Based on the mission the system is performing, the service management layer 130 selects the needed services. For example, if the mission is ES, the spectrum sensor 145 and detector 143 from the device/sensor services 140 are selected, and the signal classifier 155, SEI module 156, geolocation module 158, clustering learner 157, and case-based reasoner 153 from cognitive/learning services 135 are selected, respectively. Then the Cognitive Network Manager System/ Cognitive Networked Electronic Warfare (CNMS/CNEW) controller 120 schedules the spectrum sensor 145 to scan the RF environment. When the scanned data is available, the controller 120 assigns the detector 143 to detect whether any signals are present in the scanned data.

If signals are present, then the controller 120 activates the signal classifier 155 to identify the signal type. If the identified signal type is unknown to the system, the system collects the signal's cumulant-based features for later analysis. When enough unknown signals are collected, the controller 120 activates the clustering learner 157. If signal clusters are found, the controller 120 activates retraining of the signal classifier 155 and the signal clusters are used to retrain the system in the field. In this way, signal types previously unknown to the system can be learned and become known signals without re-training the signal classifier offline.

While signals are being classified, the controller 120 may also activate geolocation module 158 to locate the position of the RF emitters. Once the signal type is determined, the controller 120 activates the SEI module 156. The SEI module is configured to identify the specific type of emitter that was classified. The SEI module may be configured to various levels of granularity. For example, the SEI module may be able to distinguish between certain brands of cell phones at one level granularity. and may be able to distinguish between specific individual cell phones at some higher level of granularity. Using these techniques and modules, signals present in the scanned area are detected, classified and geolocated.

RF sensing may be accomplished using a spectrum sensor 145 or a radio 147. Radio 147 may be a software-defined radio, such as a QNT radio, and spectrum sensor 145 may be a spectral sensor, such as an XG sensor. QNT radios and XG sensors have been developed by Rockwell Collins, Inc. of Cedar Rapids, Iowa under DARPA programs. Furthermore, a network of spectrum sensors or radios can be used, and they can be spatially distributed in a given area. The advantage of using a network of sensors is that the detection accuracy can be improved by performing collaborative sensing, especially in fading and shadowing channels.

In addition, the location of an RF source can be determined if the signals received by three neighboring RF sensors are correlated and the locations of the sensor nodes are known. To know the locations of the sensor nodes, a GPS sensor can be included as part of the RF sensor. To know whether the signals received by the neighboring nodes are correlated, the correlation coefficient is computed at one of the sensors using three signals—two from its neighbors and one from itself. The correlation coefficient between signals X and Y with n measurements $x_i$ and $y_i$ $_{i=1,2...n}$ is defined as:

$$r_{xy} = \frac{\sum_{i=1}^{n}(x_i - \bar{x})(y_i - \bar{y})}{(n-1)\sigma_x \sigma_y}$$

Here $\bar{x}$ and $\bar{y}$ are the mean of X and Y and $\sigma_x$ and $\sigma_y$ are the standard deviation of X and Y, respectively. If the correlation coefficient has a magnitude greater than some threshold, then they are correlated. The threshold is typically determined based on some allowable probability of false alarm. If the received signals are correlated, then the location of the RF source is estimated by the time difference of arrival, which can be computed by knowing the differences in time at which the signal was received by three different sensors. Moreover, if the sensors are on mobile platforms, they can be strategically placed based on output from the terrain analysis module 151. For this, terrain data (DTED, road maps, environment) and policy engine 110 are used. Using the terrain data, the terrain type (e.g., mountainous, foliage) and occlusions (e.g., a hill between a jammer and the enemy node) are determined by the terrain analyzer. Based on the occlusions, the policy engine determines what actions to take (e.g., suggest a placement for jammer node so that the hill is not between the jammer node and the enemy node and a direct line of sight link can be established).

Signal Detection

Detector 143 is a signal detector, and is preferably implemented as a radiometer-based detector. The detector's threshold value (between noise, and signal plus noise) is adaptively varied based on the first order, or first and second order statistics of the background noise.

Detecting the presence of an unknown signal can be a difficult task, especially in the presence of noise and/or interference, each of which may or may not be known, and may also vary with time. In such an environment, a radiometer is perhaps the most basic approach to signal detection. Essentially, a radiometer measures the total power in a given spectrum over a period of time (where the spectrum can be considered either as a whole—a "single channel" radiometer, or as a set of smaller pieces to be treated separately—a "multi-channel" radiometer), and looks for anything "abnormally" large. However, the challenge becomes defining what constitutes "abnormal". Setting such a threshold too low causes too many "false alarms"—instances where the detector claims the existence of a signal when there is not one actually present, while setting the threshold too high causes the detector to more frequently miss signals that are actually present. Except under highly idealized circumstances, it is difficult to simultaneously prevent both types of errors, and making too much of an effort to fight either type usually comes with a steep price in terms of the other. Accordingly, what is usually desired is some sort of "reasonable" compromise, often taking the form of a wish to minimize the number of missed signals subject to a specified maximum rate of false alarms.

Figure 2A:
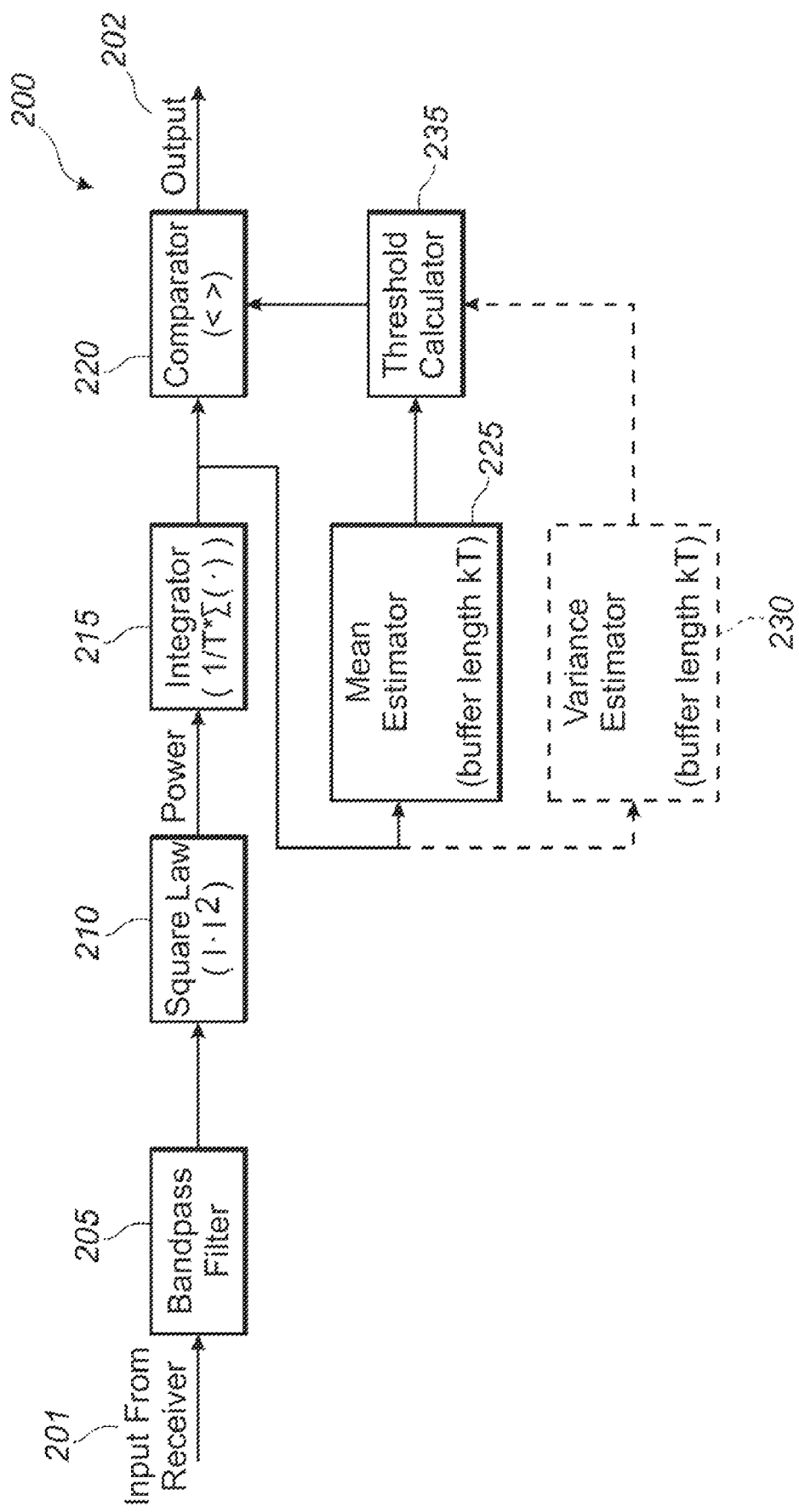
FIG. 2a shows a block diagram of a detection algorithm according to one embodiment of the disclosure.

FIG. 2a illustrates the basic operation of a radiometric signal detector. As discussed above, this detector may be utilized in the CNEW system shown in FIG. 1. However, the detection techniques disclosed herein may be used in any application where the detection of unknown signals in the presence of noise and/or interference is desirable.

First, input signal 201 is received by a radio, such as an XG sensor, and filtered by a bandpass filter (or equivalent lowpass filter at baseband) 205. Next, the squared magnitude of the bandpass-filtered data is computed at square law block 210. This corresponds to the power of the bandpass-filtered input data. Next, the power is integrated over a certain period of time at integrator 215. This integration time period is a user selectable parameter. Finally, this integrated energy/power is compared against a threshold value at comparator 220. If the energy/power is greater than the threshold, then it is hypothesized that the received data contains a signal. If it is not greater than the threshold, then it is hypothesized that the received signal contains noise only.

If the distribution of the noise and/or interference is known, a detailed statistical model can be used to set a threshold that satisfies the false alarm criterion. Otherwise, one might make one or more simplifying assumptions. Frequently, it may be assumed that the signal impairment consists of additive white Gaussian noise with a fixed power level. In that case, then for a single channel radiometer, the noise at the output of the integrator should follow a chi-square distribution of order twice the length of the integrator. Such a distribution is defined by a single parameter—usually the mean. By measuring the mean of the integrator output over a period of k integration times, one can define the threshold as a multiple of that mean, with the coefficient being calculated from the order of the chi-square distribution and the false alarm rate tolerated (increased false alarm tolerance means a smaller threshold, which reduces missed signals and effectively lowers the minimum SNR needed to attain any given level of detection performance one cares to define as "satisfactory"). This is the structure shown with solid lines in FIG. 2a.

However, this simplified case may not hold in practice. For example, it may be that the noise, while being white and Gaussian, may have time-varying power. Alternatively, the "noise" may be due to an interfering communicator, and thus may not be Gaussian or white, but might have the structure of a modulated signal. In either case, the mean estimate may no longer provide sufficient information for modeling the impairment and controlling the false alarm rate. Accordingly, one can introduce a variance estimator as well, which also analyzes the previous k integrator outputs. This information can be used to calculate the standard deviation of the integrator outputs, allowing the use of a more complex statistical model for the threshold calculation.

Returning to FIG. 2a, mean estimator 226 and variance estimator 230 are used to estimate the mean and variance to set the threshold. The threshold value is set based on the estimated mean and variance at threshold calculator 235 using the following equations (note that the standard deviation used below is the square root of the variance).

$$\text{Threshold}_{Mean} = a * \text{Mean}_{Measured},$$

$$\text{Threshold}_{MeanVar} = \text{Mean}_{Measured} + b * \text{StandardDeviation}_{Measured}$$

Empirically, for the model described above, a reasonable choice for b can be made by finding the value for a in the first definition according to the integrator length and false alarm tolerance, and equating the two expressions under "ideal" circumstances (that is, choosing the value of b such that the two expressions agree when the mean and standard deviation are related in the way the theory predicts). One example of an ideal circumstance is where the noise is additive white Gaussian noise of constant power. Subsequently, the value of b can be tweaked somewhat if desired by examining test cases with types of signal impairment similar to what is expected in practice. There may still be some variation in the false alarm rate (which is to be expected, since it is difficult to come up with a thresholding scheme that maintains a given false alarm rate under all possible noise patterns), but by making slightly conservative choices, one can keep the false alarm rate below the acceptable limit under a wide variety of conditions.

Testing has shown this approach to be effective in providing increased signal detection performance in the presence of an interferer over a mean-based threshold rule, and is able to provide moderate performance while maintaining acceptable false alarm rates in varying noise environments in which a mean-based threshold rule incurs terribly high false alarm rates.

Significantly, this method performs noticeably better against an impairment consisting of both constant envelope interference and additive white Gaussian noise than against an impairment of equal total power consisting entirely of additive white Gaussian noise. This suggests that, at least in this case, it is able to implicitly capture and exploit certain characteristics of the interferer to improve detection performance over naively considering all forms of "noise" as identical.

The methods described above are defined in terms of the mean, or mean and variance, of the integrated noise power. However, by simply using the output of the integrator directly, the algorithm is actually using the properties of the received data stream, which consists of a mixture of both signals and noise, rather than those of just the noise itself. On their own, these methods assume that the statistical properties of that mixture can be used as a reasonable proxy for those of the noise—an assumption whose validity (and consequences) may vary in different scenarios.

The approach to remedy this problem is to attempt to refine the model so that only noise data is used to calculate the desired properties. One method of doing so would be to consider the output of the detector itself—since samples that exceed the threshold are considered to contain signals, the detector could choose to exclude such samples from the pool from which the sample statistics are estimated.

While this appears to be a clever approach, its self-validating nature introduces a potential flaw. In an environment where the noise level increases, it is possible that some or all of the new, more powerful noise samples will exceed the detection threshold when integrated, yielding false alarms. Under the old arrangement, these samples would then become part of the noise model, and therefore the estimated statistics would gradually shift to reflect the new noise properties. However, with the proposed modification, the detector would (incorrectly) label these samples as containing signals, and thus exclude them from the noise model. Accordingly, the noise model will not adapt to reflect the new noise properties, so the stream of false alarms is likely to continue, violating the false alarm constraint which the detector was designed to satisfy above all else.

Figure 2B:
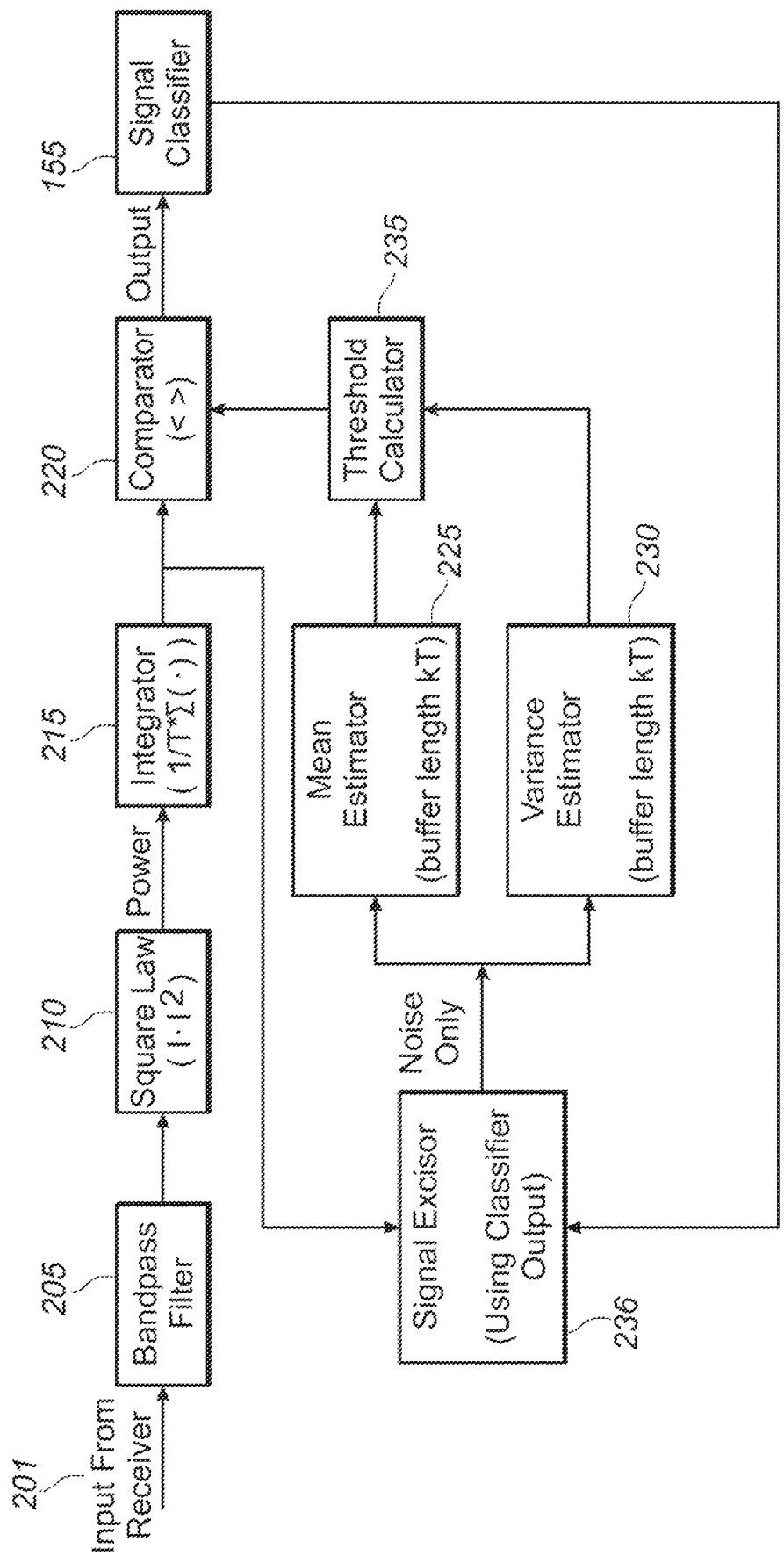
FIG. 2b shows a block diagram of a detection algorithm using the signal classifier in the threshold feedback according to another embodiment of the disclosure.

In order to refine the noise model without introducing this potential for "self-deception", it is useful to find an external means for validating the determination that a sample does, in fact, contain a signal, and should thus be excluded from the noise model. Fortunately, the classifier 155 provides just such a mechanism. FIG. 2b shows a block diagram of a detection algorithm using the signal classifier in the threshold feedback according to another embodiment of the disclosure. Samples that the detector identifies as signals are sent to the classifier 155, which identifies them as belonging to one of a set of known signal classes, as signals of an unknown class, or as noise. The classifier's determination of whether the samples are indeed signals or noise can then be fed back into the detector at signal excisor 236, which can then exclude them or include them in the noise model, accordingly. As shown in FIG. 2b, signal excisor 236 is configured to excise the integrated power signal from the mean estimator 225 and variance estimator 230 if signal classifier 155 has classified the output of the detector as a known signal or an unknown signal. Since the classifier relies on cumulant-based features (to be described subsequently) rather than integrated power per se, it is able to distinguish between high-powered noise samples and actual signals in a way that the radiometric detector simply cannot. In this way, the detector is able to use classifier feedback to improve the quality of the noise model, and thus choose a threshold that provides improved performance while robustly satisfying the designed false alarm rate limit.

Figure 3:
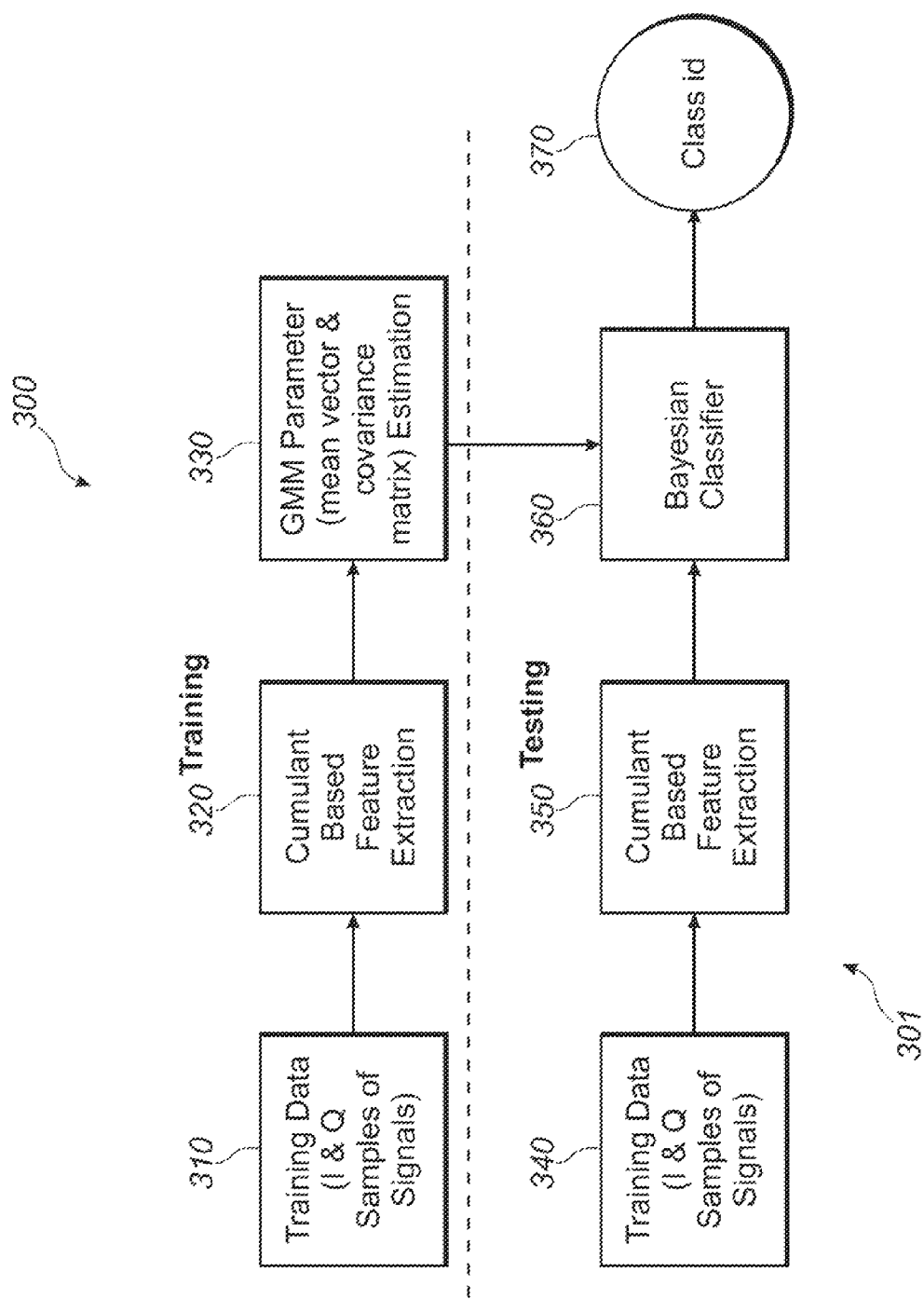
FIG. 3 shows block diagram of a classification algorithm according to one embodiment of the disclosure.

Returning to FIG. 1, signal classifier 155 identifies the type of the detected signal(s) using their baseband I/Q samples as input. The block diagram of the signal classifier is provided in FIG. 3. FIG. 3 shows that the classifier has two phases—training 300 and testing 301. During training, several instances of signals of interest 310 are considered. First, cumulant-based features 320 are extracted. Specific techniques for feature extraction will be discussed in more detail below. Next, a Gaussian. Mixture Model (GMM) 330 is fitted to these feature vectors. GMM techniques will also be discussed in more detail below. These GMMs are stored in memory. During the testing phase 301, first cumulant-based features 350 are extracted (similar to the training phase) from the detected signal 340. Then the GMM that is closest to the extracted feature vector is determined using a Bayesian decision approach 360. This relates to computing the likelihoods or probabilities and selecting the one with the maximum likelihood. The signal label associated with the GMM that produced the maximum likelihood is assigned as the type 370 (class id) of the detected signal.

Figure 4:
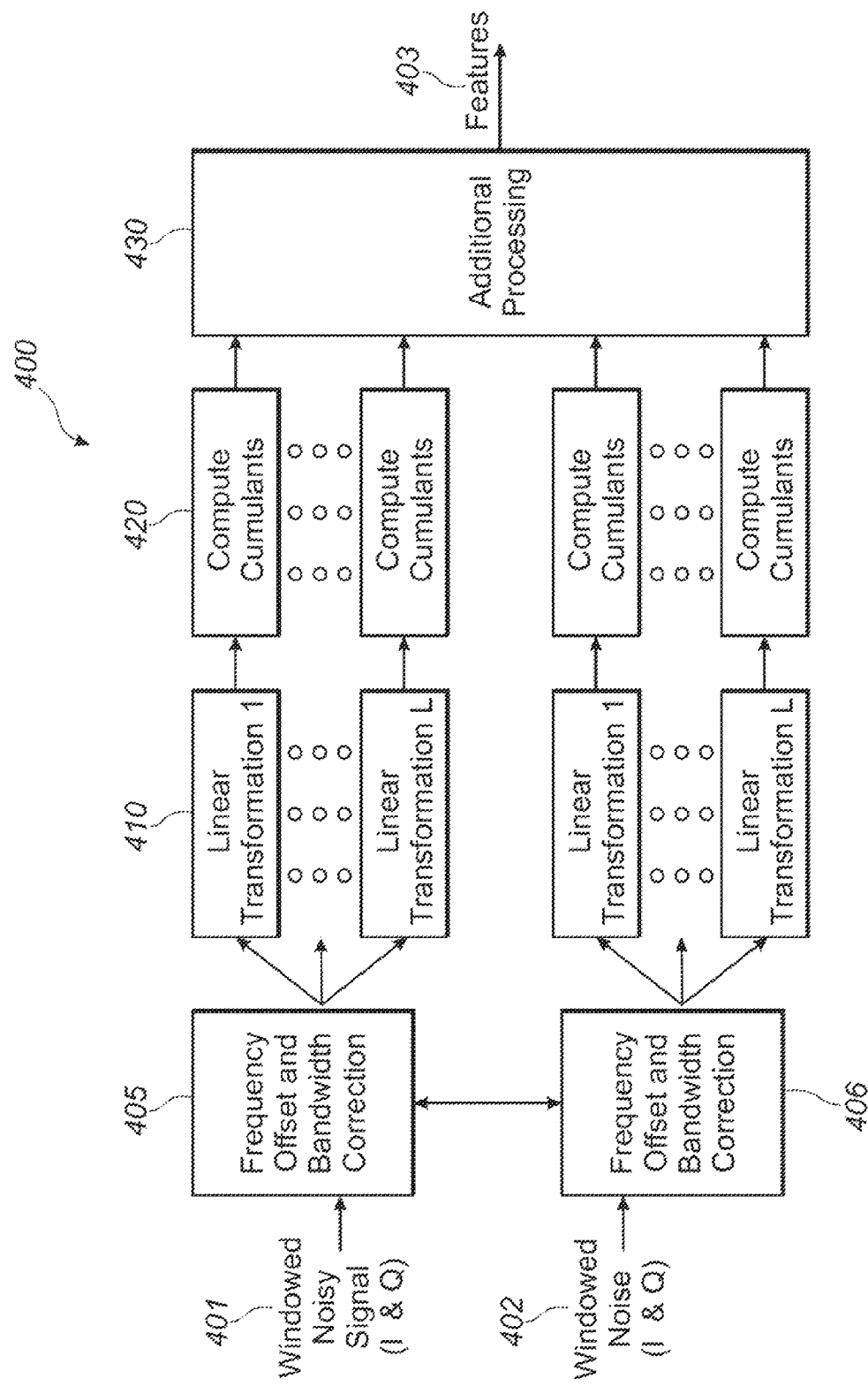
FIG. 4 shows a block diagram of a technique of cumulant feature extraction according to one embodiment of the disclosure.

The block diagram of the technique used to extract cumulant-based features is shown in FIG. 4. Frequency Offset and Bandwidth Correction 405 and 406 are configured to compute the Doppler or "center of gravity" of the power spectrum of the incoming noisy signals. The incoming noisy signals includes both the windowed noisy signal 401 and windowed noise 402. The windowed noisy signal contains signal plus noise where as windowed noise contains only noise. Before computing the "center of gravity" of the signal, the average power spectrum of the noise is subtracted off so as to not introduce bias. The bandwidth of the signal is estimated by finding the bandwidth around the Doppler frequency that contains approximately 90% of the signal (not noise) power. Due to noise, there may be multiple bandwidths that fit this requirement, so an average of all solutions is taken. The frequency offset i.e., the Doppler is corrected by multiplying the noisy signal by a complex exponential. The bandwidth is corrected by resampling so that the 90% bandwidth takes up approximately ½ the frequency domain.

Once the Doppler frequency is computed and the bandwidth corrected, multiple linear transformations 410 are performed side-by-side. In one preferred embodiment, four different linear transformations are applied. The four transformations are (1) Identity (i.e., do nothing to the signal), (2) Apply a Low Pass Filter (LPF) using the filter coefficients [1 1 1 1] (2) Apply a High Pass Filter (HPF) using the filter coefficients [1 –1 1 –1], and (4) apply a Bandpass Filter using the filter coefficients [1 1 –1 –1]. These filters are used because of ease of implementation in hardware.

Figure 5:
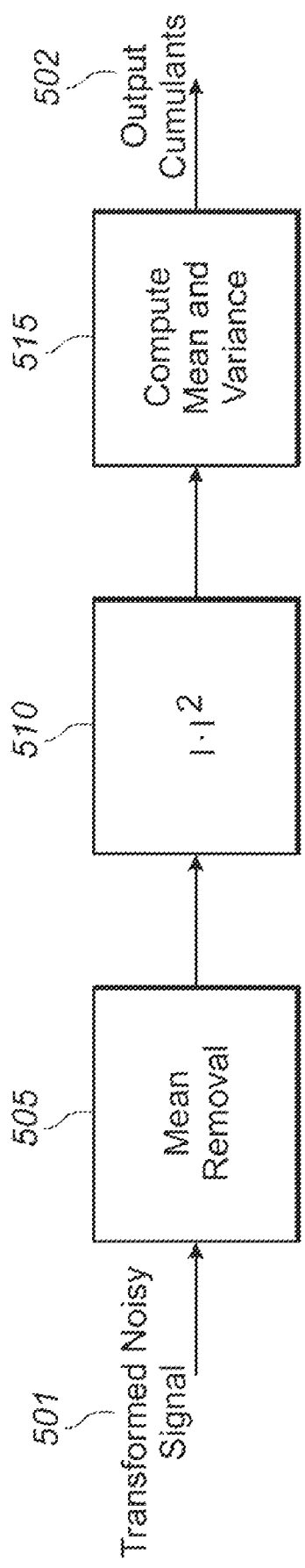
FIG. 5 shows a block diagram of the additional processing block of the cumulant feature extraction technique according to one embodiment of the disclosure.

After the linear transformations are complete, the cumulants of each transformation output are computed. As with the linear transformations, there are preferably four compute cumulant blocks 420. The first and second cumulants (mean and variance) are computed using the approach shown in FIG. 5. First, a mean removal block 505 removes the mean of the incoming linearly transformed noisy signal 501. Next, block 510 computes the magnitude square of the signal and finally block 515 computes mean and variance of the transformed noisy signal output cumulants 502. The mean is removed to make the expressions for the cumulants of the signal plus noise simpler. Since a nonzero mean at complex baseband implies the presence of an unmodulated carrier, little information is lost in doing this. The signal is magnitude squared to eliminate the dependence on the unknown carrier phase.

Returning to FIG. 4, Additional Processing block 403 carries out the following processing: Let X be the signal of interest and N be the noise. Since mean of these signals are removed, each can be considered to be zero mean. It can be shown that.

$$E[(X+N)(X+N)^*]=E[XX^*]+E[NN^*]$$

and $$Var[(X+N)(X+N)^*]=Var[XX^*]+Var[NN^*]+2E[XX^*]E[NN^*]$$

The expressions would be more complicated if X and N were nonzero mean. The usefulness of these equations is that if we know the cumulants of the noise and the cumulants of the signal plus noise, we can compute the cumulants of the signal alone. This is the first step in what we have termed "Additional Processing."

The second step of Additional Processing 403 is to eliminate the effect of the signal amplitude. Suppose A is the signal amplitude (gain) that was applied in signal generation. Then $E[XX^*]$ is proportional to $A^2$ and $Var[XX^*]$ is proportional to $A^4$. Let $\mu_i = E[XX^*]$ for the $i^{th}$ linear transformation for i=1, 2, 3, 4 mentioned above. Similarly let $\sigma^2_i$ be $Var[XX^*]$ for the $i^{th}$ linear transformation for i=1, 2, 3, 4. Using these, compute the following features:

$$f_1 = \frac{\sigma_1^2}{\mu_1^2} \quad f_5 = \frac{\sigma_3^2}{\mu_1^2}$$

$$f_2 = \frac{\mu_2}{\mu_1} \quad f_6 = \frac{\mu_4}{\mu_1}$$

$$f_3 = \frac{\sigma_2^2}{\mu_1^2} \quad f_7 = \frac{\sigma_4^2}{\mu_1^2}$$

$$f_4 = \frac{\mu_3}{\mu_1}$$

This retains the maximum amount of information from the statistics while eliminating the dependence on A. It is difficult to compute the cumulant features 403 exactly and thus there will be error introduced in the above manipulations. However, with sufficient sample size this error can be kept to a minimum. One way this error manifests itself is that the values of the computed $\sigma^2_i$ can have negative values when the effects of noise are subtracted. If this happens, a value of zero is used instead.

Returning to FIG. 1, during the training phase as mentioned above, signal classifier 155 utilizes GMMs, and they are fit to the extracted cumulant-based features. Fitting a GMM corresponds to estimating the mean vectors and covariance matrices for the selected number of Gaussian mixtures. For this estimation, the Expectation-Maximization algorithm is used. For this algorithm, the inputs are: Data (x)—features, the number of mixtures/model (M), and the number of classes (C), and the outputs from this algorithm are: a total of C Mean Vectors (μ) of length M, and a total of C Covariance Matrices (Σ) of size M×M. The multivariate normal distribution (GMM) that fits the feature for each class is given by:

$$p\left(x, \left\{\mu_i, \sum_i\right\}\right) = \sqrt{\frac{1}{(2\pi)^F \det(\sum_i)}} e^{\frac{1}{2}(x-\mu_i)^T \Sigma_i^{-1}(x-\mu_i)}$$

where F is the number of features ($f_1$-$f_5$ or $f_1$-$f_7$ in our example). Hence, the likelihood (probability of data given a classification h) is:

$$p(x \mid h) = \sum_{i=1}^{C} p\left(x, \left\{\mu_i, \sum_i\right\}\right)$$

During training phase these GMMs are computed and stored in memory for each class of signal.

Returning to FIG. 3, during deployment (which is referred to as the testing phase 301), the sampled version of the detected signal 340 is input to the classifier. The classifier first computes the cumulant features described above. It then applies the Bayesian decision process 360 to determine the class or type of the detected signal. The Bayesian decision process is as follows. Let C be the number of classes. A Bayesian classifier is a statistical classifier which utilizes Bayes' rule to make the classification decision:

$$p(h|x) = \frac{p(x|h)p(h)}{p(x)}$$

where h is a class label, x is the data-feature vector. Each class is equally likely, hence:

$$p(h) = \frac{1}{C}$$

p(x) in the above equation can be approximated as:

$$p(x) = \sum_{i=1}^{C} p(x|h_i)p(h_i)$$

Then the classification decision is: Pick a class with the largest p(h|x)

The signal classifier is an open set classifier, in that if the signal it is trying to classify is not in its database or library (i.e., the classifier is not trained for that particular signal), it classifies it as "unknown" instead of associating it with one of the classes it is trained for. For this unknown class determination, we use a distance measure based on Bhattacharya to compare the probability distributions. This distance is defined as follows:

$$dist(A, B) = \sum_{i=1}^{M_A} W_{A_i} \left[ \sum_{i=1}^{M_A} W_{B_j} d_B(p_{A_i}, p_{B_j}) \right]$$

$$d_B(p_{A_i}, p_{B_j}) = \frac{1}{8}(m_{A_i} - m_{B_j}) \sum^{-1} (m_{A_i} - m_{B_j}) +$$

$$\frac{1}{2} \ln \left( \frac{\det \frac{\sum_{A_i} + \sum_{B_j}}{2}}{\sqrt{\det \sum_{A_i} * \det \sum_{B_j}}} \right) \text{ where } p_{A_i} \text{ is } N\left(m_{A_i}, \sum_{A_i}\right)$$

Here $W_{Ai}$ is the ith component weight of GMM of class A and $W_{Bj}$ is the jth component weight of GMM of class B.

Noise is considered as one of the classes in our classifier. It is possible that what is being observed can easily be mistaken for noise instead of a new unknown class of signal. To overcome this problem, we calculate:

$$p(\text{newclass} \overline{\text{noise}})$$

If the two events are independent then $$p(n_c \wedge \overline{\text{noise}}) = p(n_c)p(\overline{\text{noise}}) =$$
$$p(n_c)[1 - p(\text{noise})]p(\text{noise}) = p(\text{noise}_0)p(\text{noise}_1) \ldots p(\text{noise}_N)$$

where $n_c$ is new class $$p(n_c) = \begin{cases} -\frac{1}{T}\max(d(class_i, \text{new})) + 1 & \max(dist(class_i, \text{new})) \leq T \\ 0 & \text{otherwise} \end{cases}$$

Here T is the set threshold of the Bhattacharya metric.

The above described classifier is also trained for noise by considering it as one of the classes mentioned above. If the detected signal is classified as noise, then feedback to the detector 143 is provided indicating that this may be a false alarm. The detector then uses that information to include those samples in the noise model, rather than excising them as a signal. By doing so, the detector is better able to adhere to the target false alarm rate.

Returning to FIG. 1, jammer 141 generates a jamming signal using the signal parameters supplied by signal classifier 155. In commercial off-the-shelf systems, noise, barrage or sweeping jamming is used because it is difficult to know the exact frequency and modulation type of the signal that needs to be jammed. However, since the signal classifier 155 of the disclosed system provides these signal parameters, a spot jammer may be employed. The main advantage of the spot jammer is that by limiting its bandwidth to cover only the known signal's bandwidth, it can be more efficient than other jammers in terms of jamming performance versus power consumption. The proposed spot jammer can be built with (a) one or more external antennas that are capable of transmitting a wide range of frequencies, (b) a signal generator that generates a jamming signal with the required center frequency and bandwidth, and (c) an RF amplifier which is responsible for boosting the power to the desired level. To make the jammers more effective and resistant to obstructions, it is preferable that they be placed in appropriate locations as determined by the terrain analysis and policy engine as described above.

Returning back to FIG. 1, controller 120 of the system is preferably implemented as software executing on a general purpose processor and should preferably be written to be as adaptable and modular as possible. User interaction with controller 120 is performed through user interface 105, which may be any type of conventional user interface. Preferably, controller 120 should communicate with other components of the system via TCP/UDP through the services management layer 130. Communication via TCP/UDP allows different components of the system to reside on different machines and at different physical locations. The system may also load XML files at startup to configure available services (service management layer 130), system policies (policy engine 110), and communication needs (Inner System Network Communication and Optimization 125). These XML files determine the overall system functionality, as well as how the system communicates with external devices. This allows new external devices and system functionality to be added simply modifying XML files The case-based reasoner 153 manages a set of previous problems and solutions. When a learning type service is requested (e.g. learn new classes ("cluster learning") or optimize), the casebase is first checked for previously found similar solutions. Each case in the casebase is a (problem, action, utility) tuple. The casebase uses a distance measure (e.g. Euclidean) and utility score to determine similar cases to the current situation. The cases from the casebase are then used either to seed the learning process, or to bypass learning altogether.

The policy engine 110 maintains a knowledgebase 115 of system settings and policies that apply to system states. The policy engine 110 can either be sent updates about the system state, or asked policy queries about current or potential states. The policy engine also automatically fires if the current state of the system changes such that one or more of its polices become active. Furthermore, the policy engine can be dynamically updated with new policies while the system is running.

Optimization Engine 152 consists of a set of optimization algorithms. For example, such optimization algorithms may include particle swarm and genetic algorithms. The engine is also designed to allow for the addition of other optimization algorithms without any internal changes to the system. The inputs to this engine are the current data values (metrics), a set of values that can be adjusted (e.g., by knobs), a utility function, and an optional initial seed (e.g., initial knob values). The outputs of the optimization engine are a set of new 'optimal' knob values and the corresponding utility value. These outputs are used to optimize the overall operation of the system, and are also stored in the case-based reasoner 153 for future use. For example, optimizations can be performed to enhance jamming capabilities. The jammer node's position, energy usage, and the resulting collateral damage to neutral or friendly communications can be optimized, given the enemy node's location and waveform type, the jammer node's distance from the enemy node, and any available terrain type/occlusion information.

The cluster learning engine 157 may be based on a G-means/K-means hybrid clustering algorithm. The cluster learner collects "unknown" feature value samples from the system into bins. When a bin contains enough samples (as specified by the system), those samples are clustered using a mixture of K-means and G-means algorithms. If a resulting cluster size is large enough (as specified by the system), the samples in that cluster are returned to the system for use in training and optimization. The cluster learner is mainly used in the CNMS/CNEW system for unknown signal clustering and retraining of the signal classifier. In the standard K-means clustering algorithm, the number of clusters K must be selected by the user.

To eliminate this need for user input, we use an enhancement to the K-Means algorithm called G-Means. This is done by first automatically selecting a low number for K based on the number of samples in the system. Then K-means clustering is performed on the samples. The resulting clusters are then analyzed to see whether they have a given distribution (usually Gaussian, though other distributions can be used). If a particular cluster does not fit the given distribution within some threshold, then the K-means algorithm is re-run on the points of that cluster. This is repeated until all the clusters fit the given distribution within some tolerance.

The Service Management Layer (SML) 130 controls system components and system flow, based on the current mission. Missions are specified in XML files and may describe:
what actions should be taken by the system
what devices/algorithms should be run
where the results should be sent and how they will be used
when and in what order services and results should be used
New missions can be added to the system by simply modifying XML files—no code changes are required. The SML also controls communication with the attached devices, sensors, and cognitive services. These services can register and deregister with the SML at anytime during operation. This allows new services to be added or removed in real time. The System also allows action and flow to be modified instantaneously in the field by changing the active mission (chosen from a predefined list, e.g. Situation awareness, Attack, Protection, Support).

In summary, the system depicted in FIG. 1 is useful for many military and commercial applications where accurate monitoring, jamming, and protection from RF threats are deemed important. The system is also useful for monitoring and repairing military networks. Furthermore, the proposed techniques enable efficient use of signal processing resources. Moreover, they can be implemented within available hardware frameworks, such as the QNT Software Defined Radio and XG sensors available from Rockwell Collins, Inc. of Cedar Rapids, Iowa.

What is claimed is:

1. A apparatus configured to detect the presence of one or more unknown signals in the presence of noise and/or interference comprising:
an input configured to receive input data from a sensor;
a bandpass filter configured to filter the input data in a predetermined band;
a square law unit configured to square the magnitude of the bandpass filtered input data;
an integrator configured to integrate the power of the input data over a period of time, wherein the integrator integrates the power of the input data after it has been filtered and squared;
a mean estimator configured to estimate the mean of the power integrated input data over a number of integration periods;
a threshold calculator configured to calculate a calculated threshold based on the estimated mean; and
a comparator configured to compare the integrated power to the calculated threshold to determine if the input data contains at least one signal, or if the input data contains noise only.

2. The apparatus of claim 1, wherein the sensor is a spectral sensor.

3. The apparatus of claim 1, wherein the threshold is calculated using the equation $Threshold_{Mean}=a*Mean_{Measured}$.

4. The apparatus of claim 3, wherein "a" is chosen according to the integration period and a false alarm tolerance.

5. A apparatus configured to detect the presence of one or more unknown signals in the presence of at least one of noise and interference comprising:
an input configured to receive input data from a sensor;
a bandpass filter configured to filter the input data in a predetermined band;
a square law unit configured to square the magnitude of the bandpass filtered input data;
an integrator configured to integrate the power of the input data over a period of time, wherein the integrator integrates the power of the input data after it has been filtered and squared;
a mean estimator configured to estimate the mean of the power integrated input data over a number of integration periods;
a threshold calculator configured to calculate a threshold based on the estimated mean;
a comparator configured to compare the integrated power to a threshold to determine if the input data contains at least one signal, or if the input data contains noise only; and a variance estimator configured to estimate the variance of the power integrated input data over a number of integration periods, wherein the threshold calculator is further configured to calculate the threshold value based on the estimated mean and the estimated variance.

6. The apparatus of claim 5, wherein the threshold is calculated using the equations $\text{Threshold}_{Mean} = a * \text{Mean}_{Measured}$ and $\text{Threshold}_{MeanVar} = \text{Mean}_{Measured} + b * \text{StandardDeviation}_{Measured}$.

7. The apparatus of claim 5 further comprising:

a signal classifier configured to classify the input data into a classification in the case that the comparator determines that the input data contains at least one signal, the signal classifier configured to classify the input data into the classification of at least a known signal class, an unknown signal class, or as a noise class; and a signal excisor configured to excise the power integrated input signal from the mean estimator and the variance estimator in the case that the signal classifier classifies the input data as the known signal class or the unknown signal class.

8. The apparatus of claim 6, wherein "a" is chosen according to the integration period and a false alarm tolerance and "b" is chosen by equating $\text{Threshold}_{Mean}$ and $\text{Threshold}_{MeanVar}$ for a predetermined circumstance.

9. The apparatus of claim 7, wherein the signal classifier is configured to utilize a cumulant-based feature extraction algorithm to classify the input data.

10. The apparatus of claim 8 wherein the predetermined circumstance is additive white Gaussian noise of constant power.

11. The apparatus of claim 9, wherein the cumulant-based feature extraction algorithm includes a Gaussian mixture model.

12. A apparatus configured to detect the presence of one or more unknown signals in the presence of noise and/or interference comprising:

an input configured to receive input data from a sensor;

a bandpass filter configured to filter the input data in a predetermined band;

a square law unit configured to square the magnitude of the bandpass filtered input data;

an integrator configured to integrate the power of the input data over a period of time, wherein the integrator integrates the power of the input data after it has been filtered and squared;

a mean estimator configured to estimate the mean of the power integrated input data over a number of integration periods;

a threshold calculator configured to calculate a threshold based on the estimated mean;

a comparator configured to compare the integrated power to a threshold to determine if the input data contains at least one signal, or if the input data contains noise only; and a signal classifier configured to classify the input data into a classification in the case that the comparator determines that the input data contains at least one signal, the signal classifier configured to classify the input data into the classification of at least a known signal class, an unknown signal class, or as a noise class; and a signal excisor configured to excise the power integrated input data from the mean estimator in the case that the signal classifier classifies the input data as the known signal class or the unknown signal class.

* * * * *